US012667937B2

(12) United States Patent
Ferrara

(10) Patent No.: US 12,667,937 B2
(45) Date of Patent: Jun. 30, 2026

(54) SNAP-JAW VICE ASSEMBLY

(71) Applicant: William Ferrara, Plantation, FL (US)

(72) Inventor: William Ferrara, Plantation, FL (US)

( * ) Notice: Subject to any disclaimer, the term of this patent is extended or adjusted under 35 U.S.C. 154(b) by 0 days.

(21) Appl. No.: 19/316,609

(22) Filed: Sep. 2, 2025

(65) Prior Publication Data

US 2026/0061562 A1 Mar. 5, 2026

Related U.S. Application Data

(60) Provisional application No. 63/688,928, filed on Aug. 30, 2024.

(51) Int. Cl.
*B25B 1/24* (2006.01)

(52) U.S. Cl.
CPC .................................... *B25B 1/24* (2013.01)

(58) Field of Classification Search
CPC ................................ B25B 1/24; B25B 1/2405
See application file for complete search history.

(56) References Cited

U.S. PATENT DOCUMENTS 994,911 A 6/1911 Dusenbery
1,261,265 A 4/1918 Miller
2,471,981 A 5/1949 Seiders
4,422,629 A * 12/1983 Carlson ................. B25B 1/2405 269/282
4,982,970 A 1/1991 Otani et al.
5,060,920 A * 10/1991 Engibarov .............. B25B 1/241 269/282
5,853,168 A 12/1998 Drake
5,899,464 A 5/1999 DeFeo
8,152,175 B1 4/2012 Maro et al.
8,540,225 B2 9/2013 Ehnstrom
9,630,299 B1 4/2017 Lien
10,835,965 B2 11/2020 Nishimiya
11,305,403 B2 4/2022 Lin et al.
2014/0284862 A1 9/2014 Bettencourt et al.
2021/0060733 A1* 3/2021 Lin ........................... B25B 1/02
2022/0040819 A1* 2/2022 Thielges ................. B25B 1/103
2022/0288747 A1 9/2022 Gleeson

FOREIGN PATENT DOCUMENTS

CN 104907952 A 9/2015
CN 108942723 A 12/2018
WO 2020216411 10/2020

* cited by examiner

*Primary Examiner* — Seahee Hong
(74) *Attorney, Agent, or Firm* — Mark C. Johnson; Johnson |Dalal

(57) ABSTRACT

A snap-jaw vice assembly having a jaw base selectively removably couplable to a vice body and having a dovetail portion and at least one member fastener forming a portion of the dovetail portion on the jaw base and including a spring and a spring fastener coupling the at least one member fastener to the jaw base, the assembly also including a first jaw member with a dovetail portion selectively removably and directly coupled to the dovetail portion of the jaw base in a spring-biased retained configuration, wherein the member fastener is configured to apply a downward locking force against the jaw member securing it for utilization on a workbench. The degree of biasing force may be selectively modified by adjusting the spring fastener.

16 Claims, 14 Drawing Sheets

3-3

3-3

SNAP-JAW VICE ASSEMBLY

FIELD OF THE INVENTION

The present invention relates generally to vice assemblies and, more particularly, relates to vice assemblies for a milling machine, such as a CNC milling machine.

BACKGROUND OF THE INVENTION

Vice assemblies are utilized by many individuals to securely and precisely retain and work with an object or "workpiece". One particular application of a vice assembly involves the use of a CNC machine, wherein the vice assembly holds workpieces during machining and typically features a low-profile design, flat ground sides for mounting flexibility, and an integrated system of jaws that uses a wedge mechanism to apply both downward and forward clamping force on the part. These vise assemblies use high clamping forces and specific jaw types to secure various shapes of the retaining object. More specifically, conventional vice assemblies typically utilize a base that is the main structure that sits on the machine table and is made with a cast iron or steel material for rigidity and stability. A stationary jaw may be affixed to the base and remains immobile during clamping. One or more movable jaws may be slid along the base and locked thereto with a screw or other fastener designed to retain the workpiece and define a "station." Some known vice assemblies utilize jaw inserts (e.g., plates) that selectively couple directly to the jaws and directly couple to the workpiece. In some instances, these jaw inserts may be of a hardened steel, a soft material, and/or have a stepped or V-shaped surface.

Some known assemblies, e.g., as disclosed in Bonertz, International Publication No. 2020/216411 ("Bonertz"), utilize spring-loaded latching elements in connection securing jaw inserts, but these latching elements are incorporated into the jaw in a manner that is not conducive to repeated use with a jaw insert or in a manner that increases the compression of a dovetail portion of the insert against the jaw in multi-directional axes. Moreover, these known assemblies also fail to couple any spring-loaded latching elements to the jaw in an effective and efficient manner.

Therefore, a need exists to overcome the problems with the prior art as discussed above.

SUMMARY OF THE INVENTION

The invention provides a snap-jaw vice assembly that provides a jaw insert and jaw that enables quick, safe, and effective coupling and decoupling of the jaw insert and that overcomes the hereinafore-mentioned disadvantages of the heretofore-known devices and methods of this general type.

With the foregoing and other objects in view, there is provided, in accordance with the invention, a snap-jaw vice assembly that includes a jaw base with a base lower surface selectively removably couplable to a vice body, with two opposing base side surfaces, with a base upper surface, with a first pair of opposing base sidewalls, and with at least one member fastener coupled to the jaw base with a spring and a spring fastener, wherein the at least one member fastener form one of the first pair of opposing base sidewalls and the assembly also includes a first jaw member with a pair of opposing member sidewalls spanning along a member length separating two opposing terminal member side surfaces of the first jaw member and with the pair of opposing member sidewalls selectively removably and directly coupled to the first pair of opposing base sidewalls in a spring-biased retained configuration.

In accordance with another feature, an embodiment of the present invention includes the jaw base having two member fasteners each coupled to the jaw base and a guide member interposed between the two member fasteners, configured to couple with a guide member on the first jaw member in a M-F coupling configuration, and configured to align each of the two opposing base end surfaces with one of the two opposing terminal member side surfaces.

In accordance with a further feature of the present invention, the guide member is configured to align each of the two opposing base end surfaces with one of the two opposing terminal member side surfaces to define two parallel planes separated by edges defining the two opposing base side surfaces and edges defining the two opposing terminal member side surfaces.

In accordance with yet another feature, an embodiment of the present invention also includes a first base channel defined by the first pair of opposing base sidewalls and a cantilevered portion of the first jaw member, including the pair of opposing member sidewalls, and selectively removably disposed in the first base channel, directly coupled to the jaw base, and compressed and forced inwardly toward the jaw base by the at least one member fastener.

In accordance with an additional feature of the present invention, the first base channel and the cantilevered portion continuously span the member length.

In accordance with yet another feature, an embodiment of the present invention also includes the jaw base having two member fasteners each coupled to the jaw base and biased to move toward the first base channel and a guide member interposed between the two member fasteners disposed within the first base channel, configured to couple with a guide member on the first jaw member in a M-F coupling configuration.

In accordance with an exemplary feature of the present invention, the guide member is configured to couple with a guide member on the first jaw member in the M-F coupling configuration to align each of two opposing base end surfaces with one of the two opposing terminal member side surfaces. Further, the at least one member fastener may also form a portion of the base upper surface and includes the spring fastener accessible from the base upper surface.

In accordance with another feature, an embodiment of the present invention also includes a second first pair of opposing base sidewalls of the jaw base, a second member fastener coupled to the jaw base with a spring and a spring fastener operably configured to selectively increase or decrease a spring bias of the second member fastener, wherein the second member fastener forms one of the second pair of opposing base sidewalls and a first member upper surface is defined by outer edges of the first jaw member. A second jaw member is also utilized with a pair of opposing member sidewalls spanning along a member length separating two opposing terminal member side surfaces of the second jaw member, with a second member upper surface defined by outer edges of the second jaw member, and with the pair of opposing member sidewalls of the second jaw member selectively removably and directly coupled to the second pair of opposing base sidewalls in a spring-biased retained configuration, wherein the first and second member upper surfaces are disposed in perpendicular orientations relative to one another.

In accordance with a further feature of the present invention, the at least one member fastener is compressed against one of the pair of opposing member sidewalls and another of the pair of opposing member sidewalls is compressed against one of the first pair of opposing base sidewalls, forcing the first jaw member inwardly toward the jaw base.

In accordance with yet another feature, an embodiment of the present invention also includes the jaw base includes a threaded aperture defined thereon and with the spring fastener disposed therein and threadedly coupled to the jaw base.

In accordance with a further feature, an embodiment of the present invention also includes the at least one member fastener having a fastener channel spanning from a lower flange member to an upper opening and having the spring disposed therein and compressively retained by the spring fastener and the lower flange member, wherein the at least one member fastener is operably configured to translate independent of the spring fastener.

In accordance with yet another feature, an embodiment of the present invention also includes the vice body having the jaw base selectively removably coupled thereto in a tongue-and-groove and spring-biased configuration.

In accordance with an exemplary feature, an embodiment of the present invention also includes the vice body having a base retention member coupled to a rail member configured to linearly translate in the vice body and including spring member coupled to spring and compressively coupled against the jaw base to retain the jaw base against the base retention member.

In accordance with the present invention, a snap-jaw vice assembly is disclosed that includes a jaw base with a base lower surface selectively removably couplable to a vice body, with two opposing base side surfaces, with a base upper surface, with a dovetail portion, and with at least one member fastener forming a portion of the dovetail portion and having a spring and a spring fastener coupling the at least one member fastener to the jaw base and a first jaw member with a dovetail portion selectively removably and directly coupled to the dovetail portion of the jaw base in a spring-biased retained configuration.

In accordance with yet another feature, an embodiment of the present invention also includes jaw base having a guide member configured to couple with a guide member on the first jaw member in a M-F coupling configuration and configured to align each of two opposing base end surfaces on the jaw base with one of two opposing terminal member side surfaces on the first jaw member.

Although the invention is illustrated and described herein as embodied in a snap-jaw vice assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one, wherein the utilization of "a" or "an" does not mean multiple structures with various functions may be utilized to equate to single claimed structure with claimed functionality. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the mount assembly or, where applicable, a direction where a length of an object is greater than the diameter or width of that same object.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION OF INVENTION

Figure 2:
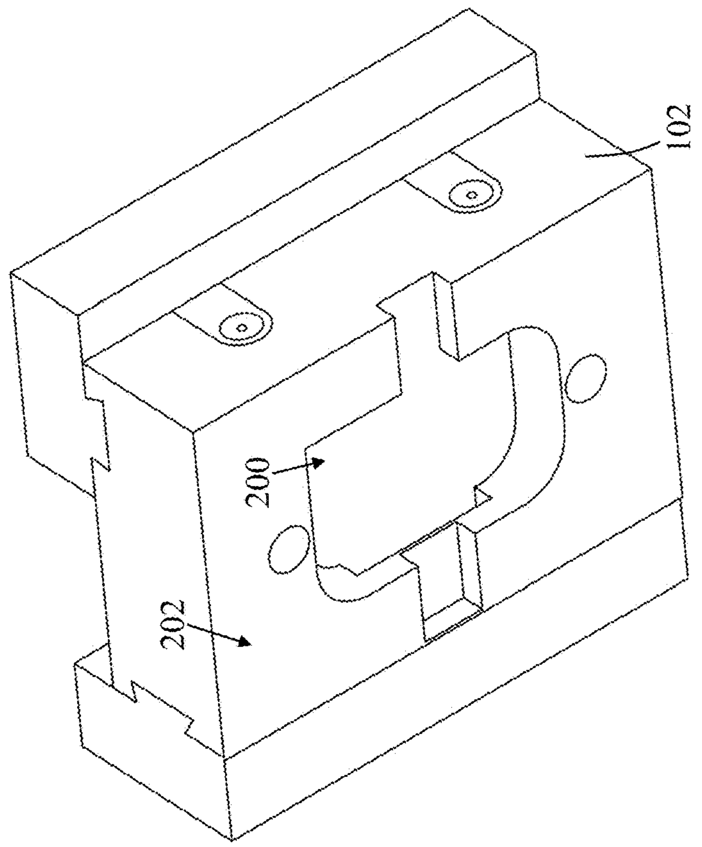
FIGS. 1-2 depict an overhead and underneath perspective views of a snap-jaw vice assembly in accordance with one embodiment of the present invention.
Figure 1:
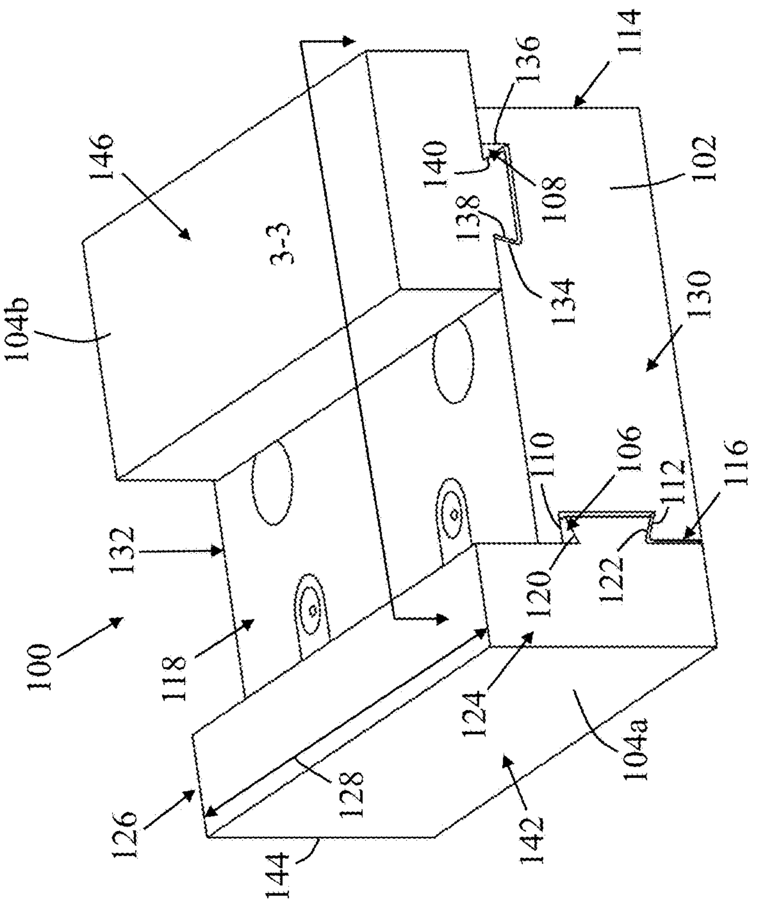

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Referring now to figures, embodiments of the present invention are shown. For example, FIGS. 1-7 show several advantageous features of the present invention, but, as will be described below, the invention can be provided in several shapes, sizes, combinations of features and components, and varying numbers and functions of the components. With reference primarily to FIGS. 1-4 and periodically to other figures, a first example of a snap-jaw vice assembly 100 is shown. The snap-jaw vice assembly 100 includes a jaw body 102 defining a cutout 200 with a lower surface 202 that is operably configured to receive a fastener (exemplified with numeral 1100 in FIG. 11) on a vice body 600 and lock thereto using, for example, tongue-and-groove configuration. While the cutout 200 is depicted as a female configuration configured to mate with a male configuration, the jaw base 102 may be configured in a male configuration configured to mate with a female configuration on the vice body 600, wherein both configurations are referred to as male-female or "M-F" coupling configuration. The materials used by the components in the assembly 100 are preferably substantially rigid, e.g., of a metallic material such as aluminum, but may be of another rigid material that doesn't plastically deform or fail under conventional stresses associated with vice assemblies.

Figure 6:
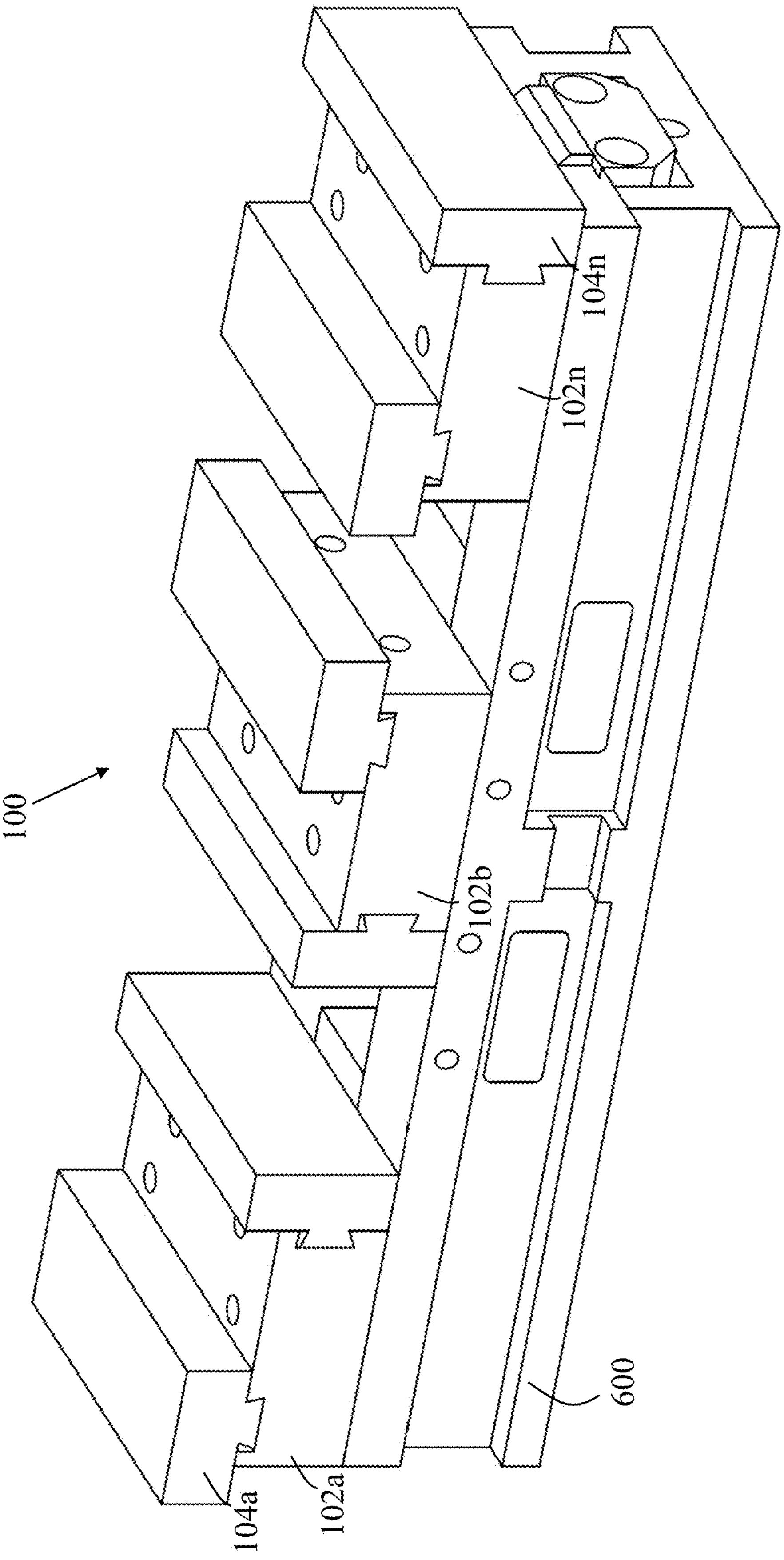
FIG. 6 depicts a perspective views of a snap-jaw vice assembly in accordance with one embodiment of the present invention.

With reference briefly to FIG. 6, the vice body 600 and jaw bodies 102*a-n* define channels for material/debris to be inserted, retained, and removed on a workbench. The vice body 600 may be coupled to a worktable/workbench and have a portion thereon (e.g., a rail or lead screw 1400—exemplified in FIG. 14) translatable along a path that also moves one or more of the jaw bodies 102*a-n*, wherein "n" represents any number greater than one. Specifically, the vice body 600 may include one or more fixed and/or removable jaws 102*a-n* (sometimes referred to as vice lids) that beneficially include one or more selectively couplable snap-fit jaw inserts 104*a-n* configured to be oriented in various orientations (horizontal and vertical) and heights relative to the respective jaw body 102 to generate a more versatile vice assembly 100 than those known assemblies and methods in the art.

Referring back to FIGS. 1-4, the jaw base 102 includes one or more jaw members 104*a-n*, wherein there are preferably only a vertically oriented jaw member 104*a* and a horizontally oriented jaw member 104*b*. The horizontally oriented jaw member 104*b* beneficially enables a larger and increased workable area as compared to other known jaw members, particularly vertically oriented jaw members. The jaw members 104*a-n* beneficially enable selective height adjustment and retention of the target object being cut by the milling machine. The jaw members 104*a-n* may be considered "soft" in relation to hardness of the jaw base 102 and/or vice body 500 or in the context of the jaw members 104*a-n* being configured to be cut by the bit of the milling machine.

The assembly 100 beneficially incudes one or more spring-loaded member fasteners (e.g., fasteners or nuts 300*a-n*) operably configured to retain a jaw member thereon by creating a compressive and downward force (the vector of which is represented with arrow 302) against a dovetail portion or cantilevered portion 304 of the jaw member 104. As seen in other figures, the jaw members 104*a-n* may be of a female dovetail configuration and the jaw base 102 is of a male dovetail configuration. This compressive force is sufficient to both longitudinally and transversely retain the jaw member 104 onto the jaw base 102. A locked position of the jaw member 104 relative to the jaw base 102 is exemplified in FIG. 3, wherein an unlocked position is exemplified in FIG. 4. The unlocked position may be caused by an external force (represented with arrow 316), e.g., the user pushing outwardly against the biasing force of the spring 308 a distance sufficient to remove an opposing wall 122 from the angle of the wall 112 on the jaw base 102.

The member fasteners 300*a-n* may be threaded or unthreaded and may be shaped to receive a spring fastener, such as a screw 306, bolt, etc., that is surrounded and biased by a spring members 308 retained entirely or partially by the fastener 300. The spring members 308 may be helical, coiled, leaf, or another inherent spring-like structure configured to carry out the limitations and intent herein. As exemplified in FIG. 3, the jaw base 102 may also include a threaded aperture 310 for receiving and retaining the spring fastener 306, whereby the distance the spring fastener 306 is threaded into a bore or threaded portion 310 generates a greater spring biasing force (which is sometimes required for harder materials desired to be cut).

Said another way, the jaw base 102 includes a base lower surface 202 selectively removably couplable to a vice body 500 and also includes two opposing base side surfaces 114, 116, a base upper surface 118, and two opposing base end surfaces 130, 132. As seen in the figures, one or both of the base side surfaces 114, 116 and the base upper surface 118 may be configured to receive and retain a jaw member 104 in a spring-biased dovetail configuration. The jaw base 102 also beneficially includes a first pair of opposing base sidewalls 110, 112, that may be disposed at angled dovetail configurations and span inwardly. The jaw base 102 also includes one or more member fasteners 300*a-n* coupled to the jaw base 102 with a spring 308 and a spring fastener 306, wherein the member fastener(s) 300*a-n* form one of the first pair of opposing base sidewalls 110, 112.

In one embodiment, the jaw base 102 may also include the threaded aperture 310 defined thereon and that includes the spring fastener 306 disposed therein and threadedly coupled to the jaw base 102. The member fastener(s) 300*a-n* may beneficially include a fastener channel 322 spanning from a lower flange member 324 to an upper opening 326 and have the spring 308 disposed therein and compressively retained by the spring fastener 306 and the lower flange member 324. The member fastener(s) 300*a-n* are operably configured to translate (e.g., linearly) independent of the spring fastener 306 to enable selective adjustment of jaw member 104 relative to the jaw base 102. The upper opening 326 may provide user access to a head of the spring fastener 306 for the selective adjustment. In one embodiment, the member fastener(s) 300*a-n* each respectively form a portion of the base upper surface 118 and includes the spring fastener 306 accessible from the base upper surface 118 (for quick and efficient access).

The first jaw member 104*a* may be of an oblong shape (e.g., rectangular block) with a pair of opposing member sidewalls (e.g., sidewalls 120, 122) spanning along a member length 128 separating two opposing terminal member side surfaces (e.g., side surfaces 124, 126) of the first jaw member 104. The opposing member sidewalls 120, 122 are configured to be selectively removably and directly coupled to the first pair of opposing base sidewalls 110, 112 in a spring-biased retained configuration (generating the downward and compressive force).

In one embodiment, a first base channel 106 is defined by the first pair of opposing base sidewalls 110, 112 and, when a second jaw member 104*b* is coupled to the jaw base 102, a second base channel 108 is defined by a second pair of opposing base sidewalls 134, 136. A cantilevered portion 304 of the first jaw member 104*b* that includes the pair of opposing member sidewalls 120, 122 is selectively removably disposed in the first base channel 106, directly coupled to the jaw base 102, and compressed and forced inwardly toward the jaw base 102 by the at least one member fastener (exemplified in FIG. 3 with member fastener 300*a*). In preferred embodiments, the first and second base channels 106, 108 and the cantilevered portions (e.g., portion 304) on the jaw members 104*a-b* continuously span the member length 128 (i.e., without at least one interrupted portion).

Figure 7:
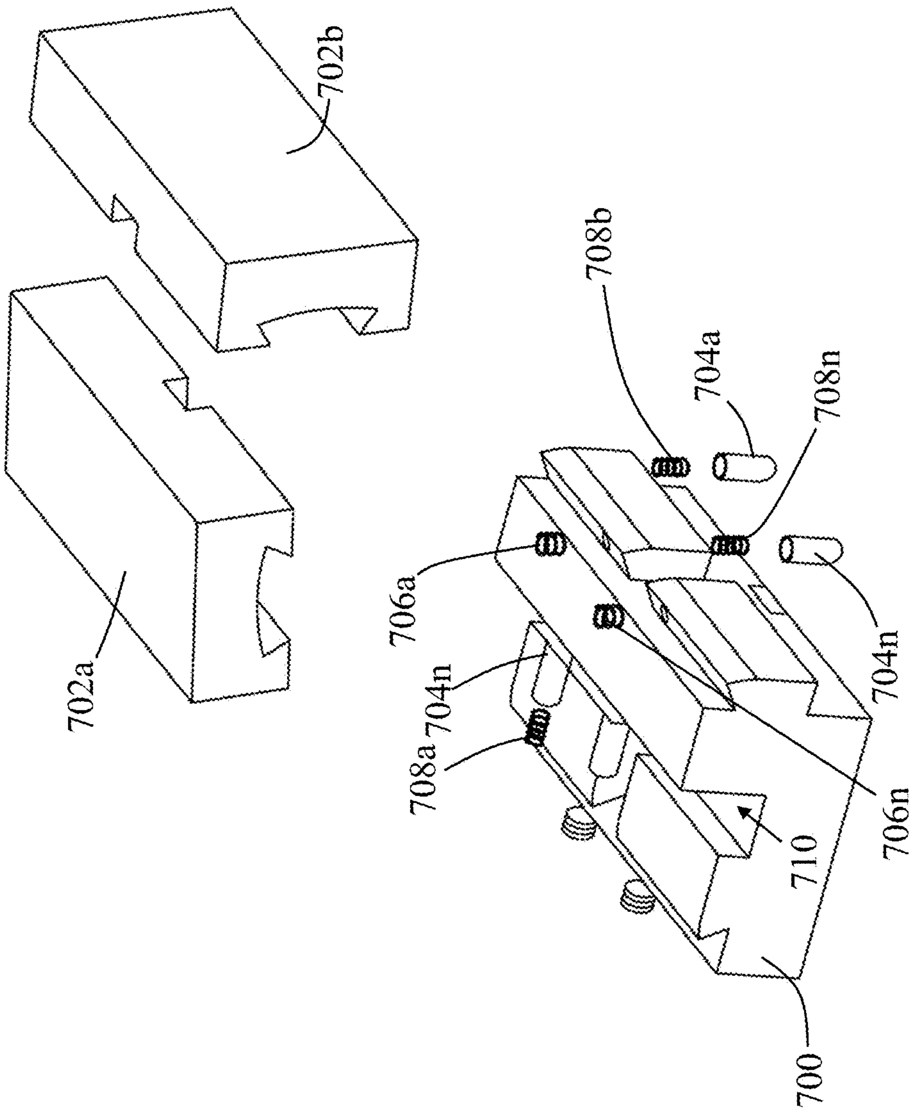
FIG. 7 depicts an exploded view of a snap-jaw vice assembly in accordance with one embodiment of the present invention.
Figure 9:
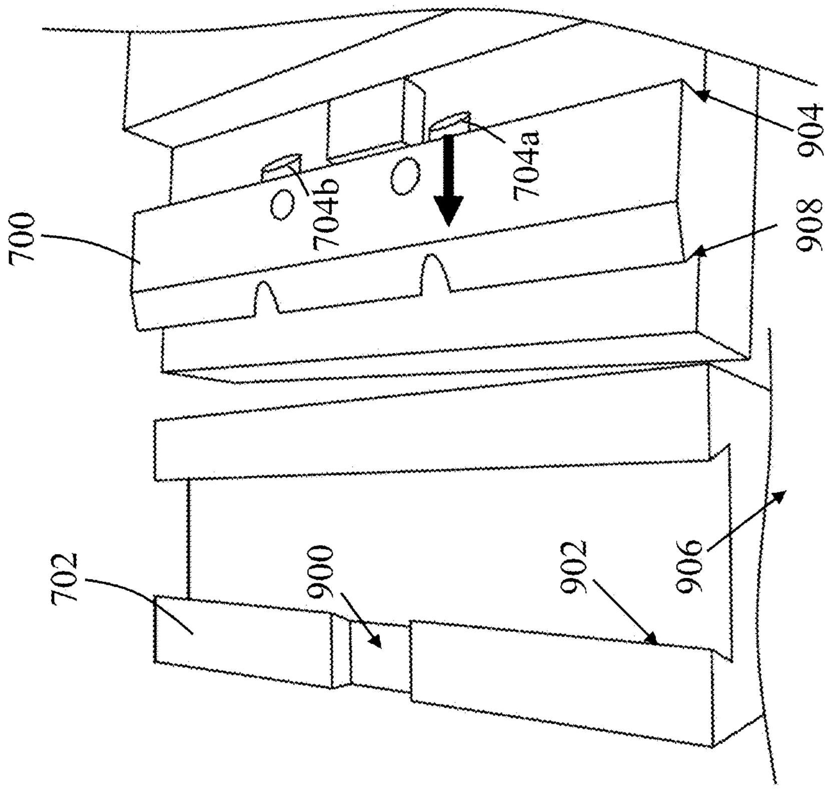
FIGS. 8-9 depict overhead perspective views of the snap-jaw vice assembly in FIG. 7.
Figure 8:
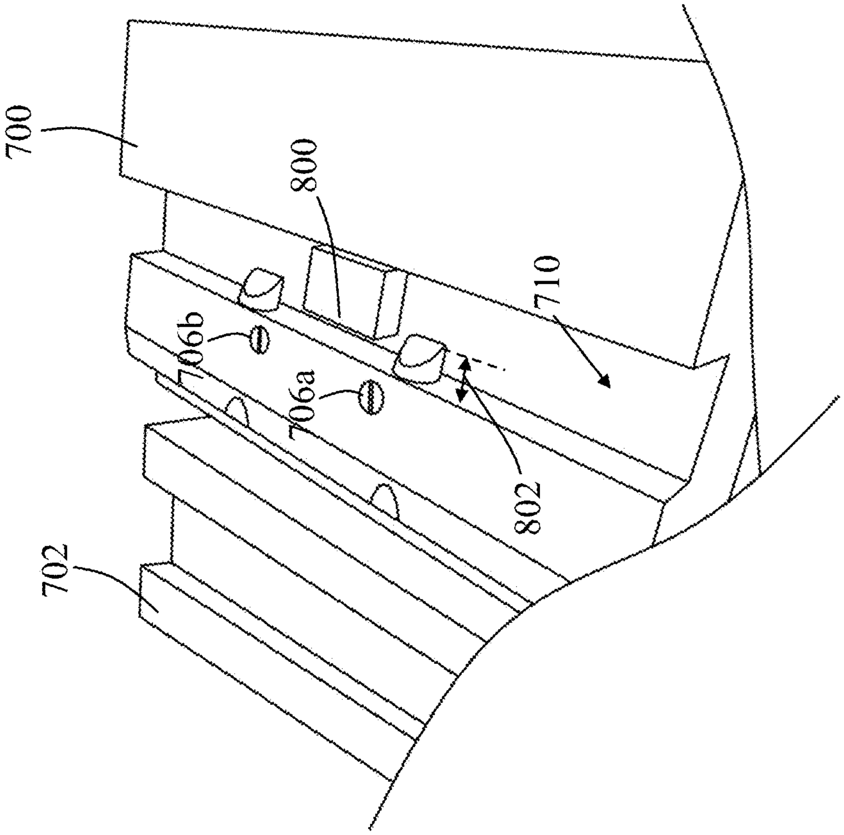

With reference to FIGS. 7-9 by way of example, the channels 106, 108 may beneficially include a guide member 800 disposed therein for receiving a corresponding guide member 900 defined by a jaw member 104. In one embodiment, the jaw base 102 includes two member fasteners 300*a* coupled thereto and biased to move toward the respective base channel. The guide member 800 is interposed between the two member fasteners 300*a-b* to provide a balanced coupling of the jaw member 104 and is disposed within the base channel (e.g., channel 106). The guide member 800 is beneficially configured to couple with the guide member 900 on the first jaw member 104*b* in a M-F coupling configuration (preferably in a friction fit configuration that further facilitates inhibiting traverse movement of the jaw member 104). In one embodiment, the guide member 800 is configured to couple with a guide member 900 on the first jaw member 104*b* in the M-F coupling configuration to align each of two opposing base end surfaces 130, 132 with one of the two opposing terminal member side surfaces 124, 126. Said differently, the guide member 800 is configured to align each of the two opposing base end surfaces 130, 132 with one of the two opposing terminal member side surfaces 124, 126 to define two parallel planes 1000, 1002 (best depicted in FIG. 10) separated by edges defining the two opposing base side surfaces 114, 116 and edges defining the two opposing terminal member side surfaces 124, 126. This configuration beneficially minimizing exposed portions of the jaw base 102, that are conventionally over exposed, from being damaged in the forming processing.

FIGS. 7-15 depict other embodiments of the present invention. For example, a vice body 1102, a jaw base 700, jaw members 702*a-b*, member fastener(s) 704*a-n*, spring fastener(s) 706*a-n*, and spring(s) 708*a-n* are depicted. Like the embodiment depicted in FIGS. 1-6, the member fastener(s) 704 are configured to be retained within the jaw base 700 and project into a channel 710 defined within or by the jaw base 700. Preferably the channel 710 defines, at least partially, the dovetail configuration enabling the M-F coupling configuration. As such, the fastener(s) 704*a-n* may be biased and project to a fastener tip a length 802 approximately 6-25 mm into the channel 710. The fasteners 704*a-n* are also preferably chamfered or tapered as shown to facilitate and enable a dovetail portion of a jaw member 702. The fastener(s) 304*a-n* may retract into the their respective bores caused by an external force and, once the dovetail portion extends past the thickness of the fastener(s) 304*a-n*, the fastener(s) 304*a-n* snap into a respective jaw member 702 (with the potential energy caused from the spring) to retain the jaw member 702 to the jaw base 700.

With reference to FIGS. 1-9, a second jaw member, e.g., 104*b*, 704*b*, may be utilized to create a vice assembly with greater versatility. The second jaw member 104*b*, 704*b* is similarly configured to the first jaw member 104*a*, 704*a* and to couple with a jaw base in dovetail configuration that prevents longitudinal movement and correct orientation of the jaw member when fastened to the jaw base. Said another way and with reference to FIGS. 1-6, the assembly 100 includes a second first pair of opposing base sidewalls 134, 136 of the jaw base 102, a second member fastener (depicted in FIG. 5) coupled to the jaw base 102 with a spring and a spring fastener operably configured to selectively increase or decrease a spring bias of the second member fastener, wherein the second member fastener also form one of the second pair of opposing base sidewalls 134, 136. The first member upper surface 142 that is defined by outer edges 144 of the first jaw member 104*a* is configured to be substantially perpendicular (+/−10°) to the second member upper surface 146.

More specifically, a second jaw member 104*b* is utilized with a pair of opposing member sidewalls 138, 140 spanning along a member length separating two opposing terminal member side surfaces of the second jaw member 104*b*, with a second member upper surface 146 defined by outer edges of the second jaw member 104*b*, and with the pair of opposing member sidewalls 138, 140 of the second jaw member 104*b* selectively removably and directly coupled to the second pair of opposing base sidewalls 134, 136 in a spring-biased retained configuration (generating a downward and compressive force). The first and second member upper surfaces 142, 146 are disposed in perpendicular orientations relative to one another (i.e., having one jaw member 104*a* in a vertical orientation and another jaw member 104*b* in a horizontal orientation). In one embodiment, the member fastener(s) 300 is compressed against one of the pair of opposing member sidewalls 120, 122 and another of the pair of opposing member sidewalls 120, 122 is compressed against one of the first pair of opposing base sidewalls 110, 112, forcing the first jaw member 104*a* inwardly toward the jaw base 102.

Figure 3:
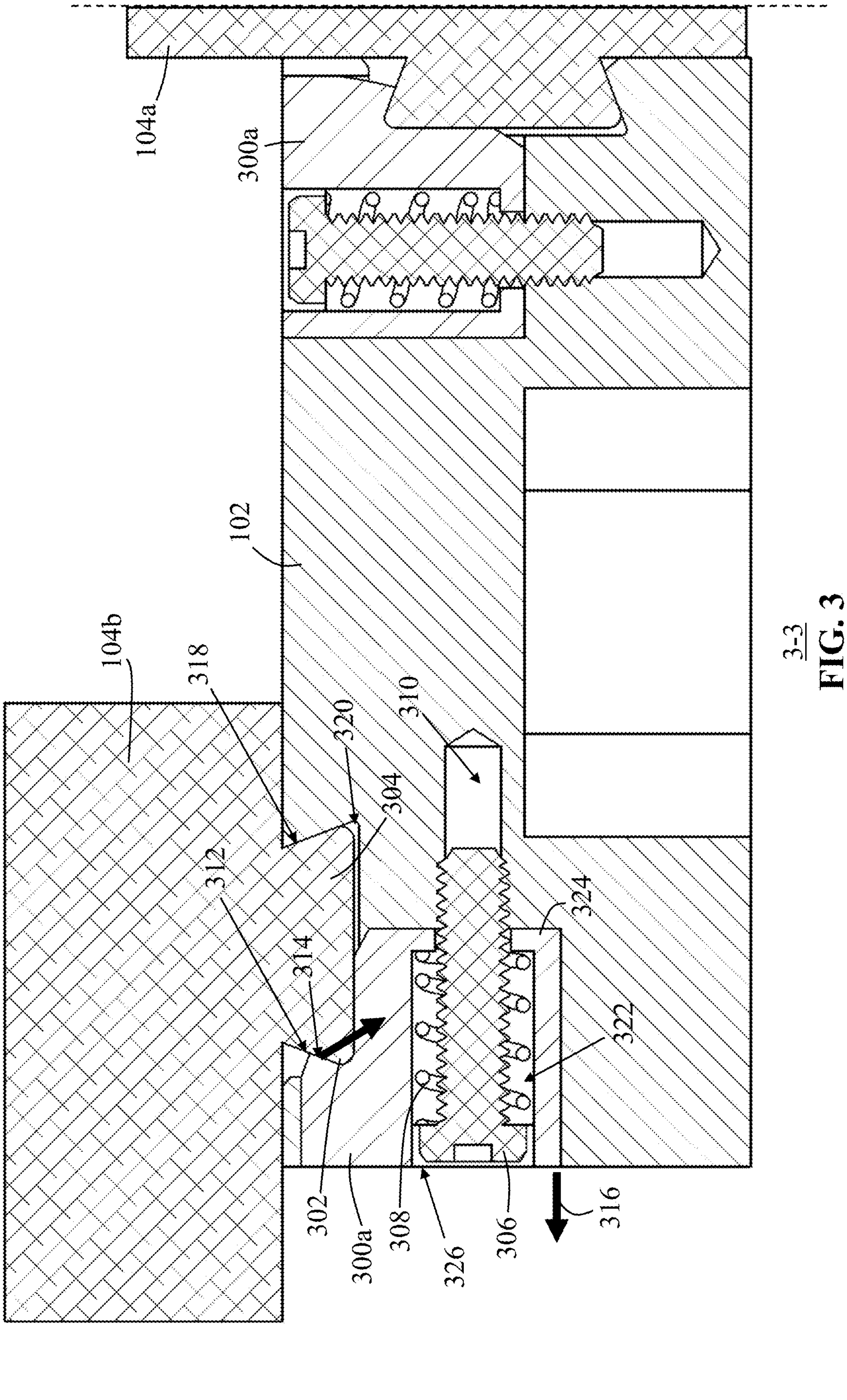
FIGS. 3-4 depict cross-sectional views of the snap-jaw vice assembly in FIG. 1 along section line 3-3.
Figure 4:
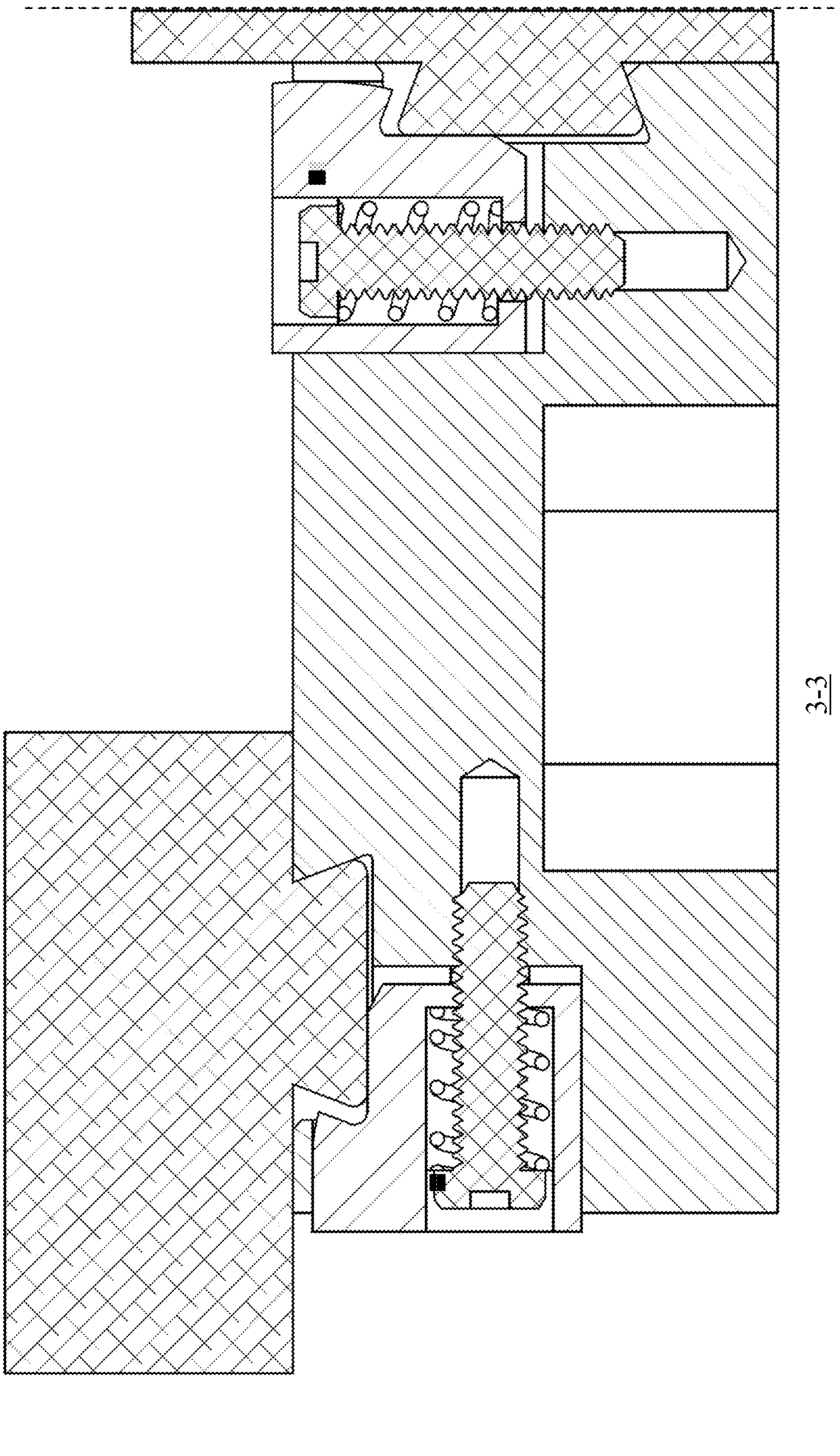
Figure 5:
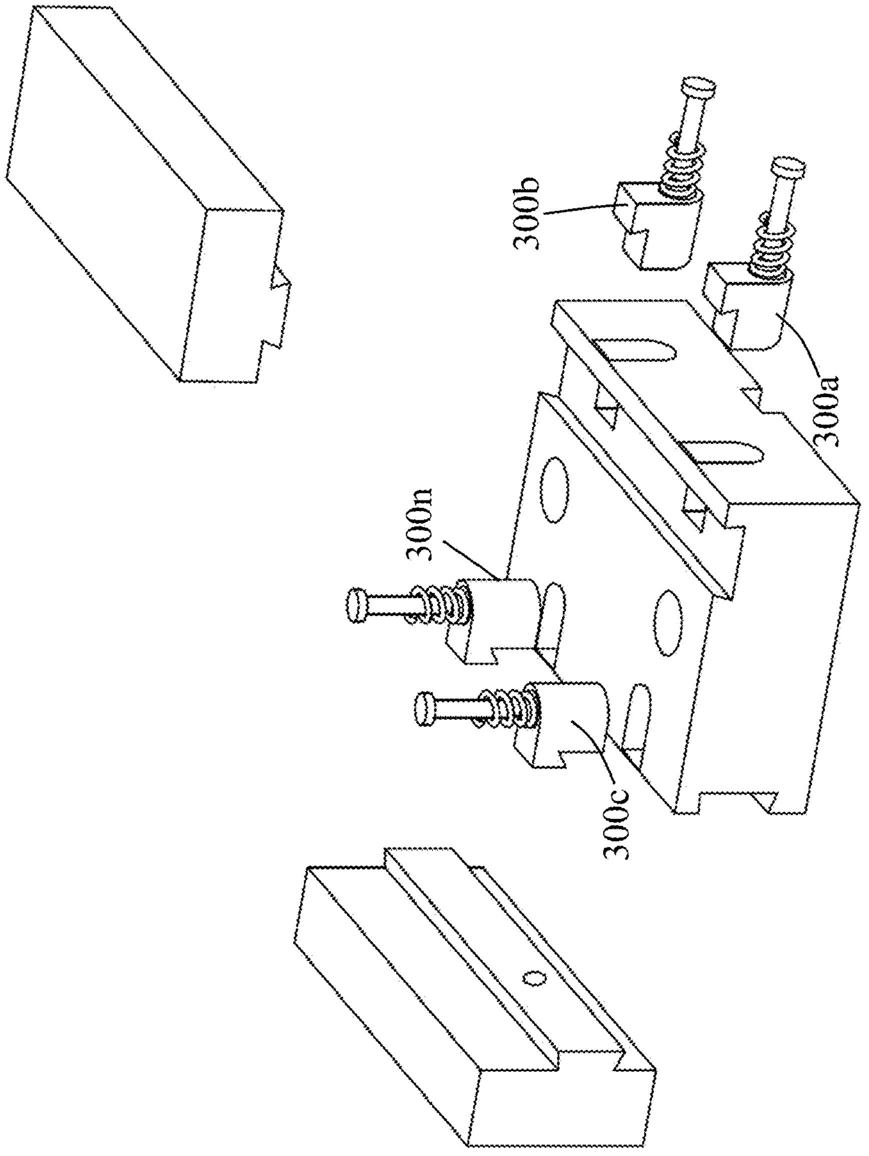
FIG. 5 depicts an exploded view of the snap-jaw vice assembly in FIG. 1.

With reference specifically to FIGS. 3-4 by way of example, one method of operation and use, i.e., when the user wants to selectively fasten/directly couple and uncouple the jaw member from the jaw base 102, the user may start by inserting one end surface 312 of the dovetail portion 304 flush against the wall surface 314 of the fastener 300*a* and generating a transverse force (represented with arrow 316) to cause the fastener 300*a* to move, wherein the user will then insert the opposing end surface 318 of the dovetail portion 304 to held flush against the wall surface 320 defining the channel 108. The arcuate shape or angled (acute) orientation of the surfaces 320, 314 defining the channel causes the retention force 302. Preferably, the assembly 100 utilizes two fastener(s) 300*a-b* separated a sufficient distance apart (e.g., 2-4 in.) to equally apply the retention/compression force 302 and said fastener(s) are preferably flanking the guide member 800 (shown best in FIG. 8) and corresponding channel. To decouple or remove the jaw member, the user will apply a transverse force 316 sufficient to overcome the biasing force (e.g., 10 lbf) and raise the end surface 318 outside of the channel, thereby enabling the entire jaw member 104 to be removed from the channel 108.

With respect to the embodiment shown in FIGS. 7-15, a very similar method of operation and use to snap-fit the jaw member 702 onto the jaw base 700 can be carried out. Specifically, the user may start by inserting one end surface 902 of the dovetail portion flush against the wall surface 904 of the dovetail portion on the base 700 and simultaneously retracting the fastener(s) 704*a-b* that are retained by spring fasteners 706*a-b*. Then the user will take the opposing end surface 906 of the dovetail portion and place it flush against the wall surface 908 of the dovetail portion. An opposite operation may also preferably occur where a user will place the surface 906 first flush against the surface 908 and then push the jaw member 702 downwardly against the chamfered or tapered portion of the fastener(s) 704*a-b*. The user may move the jaw member 702 transversely to align the guide members 800, 900 and then continue pressing downwardly until the fastener(s) 704*a-b* snap passed the edge, into the channel, and flush against the surface 902.

Said another way, the assembly may include a jaw member 702 shaped as an oblong structure having outer walls, that may be planar, and has an inner dovetail shaped channel defined by a base lower wall flanked by two opposing base sidewalls disposed at an acute angle relative to the base lower wall, wherein the inner dovetail shaped channel spans a longitudinal length of the jaw member. Additionally, the assembly includes a jaw base 700 with a lower surface selectively removably coupled to a vice body, having a dovetail portion shaped to correspond with the dovetail shaped channel and having two opposing jaw walls and having at least one fastener biased with a spring and operably configured to depress when overcoming a bias force of the spring to cause the opposing base sidewalls to be retained and compressed by the opposing jaw walls and the dovetail portion to be disposed within the inner dovetail shaped channel and compressively retained by the jaw base. The user will remove the jaw member 702 when needed and can effectively and efficiently interchange jaw members 702 depending on the height or other dimension(s) the user is attempting to accommodate (both vertically and horizontally) and effectively retain the same to the jaw base 700.

Figure 10:
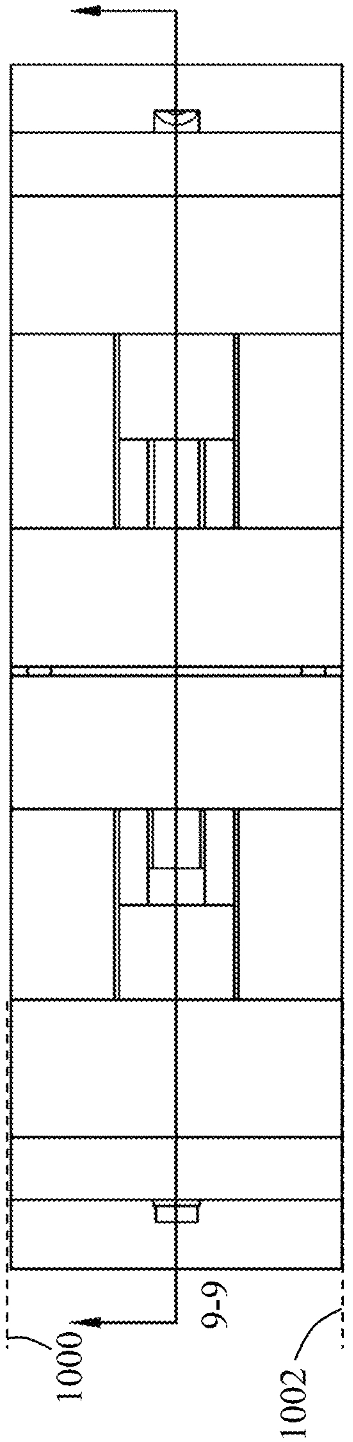
FIG. 10 depicts a top plan view of a snap-jaw vice assembly in accordance with one embodiment of the present invention.
Figure 11:
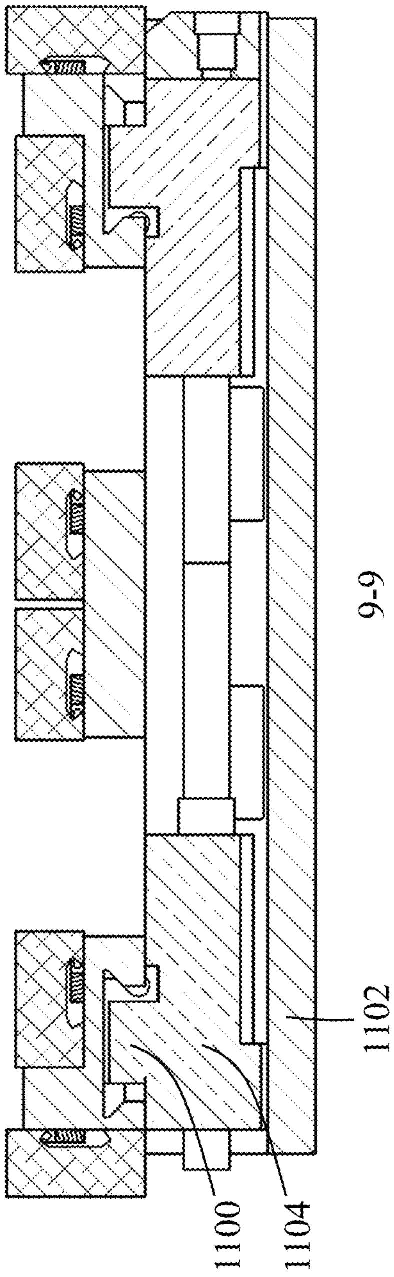
FIG. 11 depicts a cross-sectional view of the snap-jaw vice assembly in FIG. 10 along section line 9-9.
Figure 12:
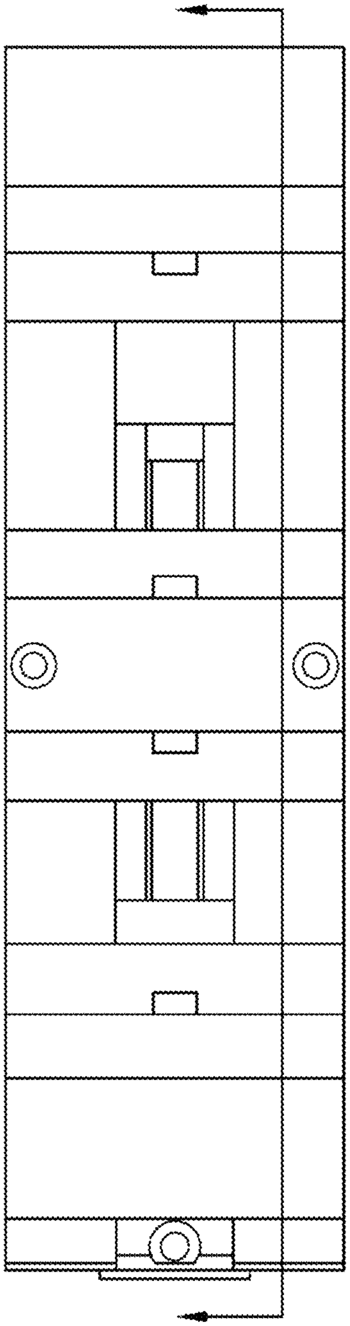
FIG. 12 depicts a top plan view of a snap-jaw vice assembly in accordance with one embodiment of the present invention.
Figure 13:
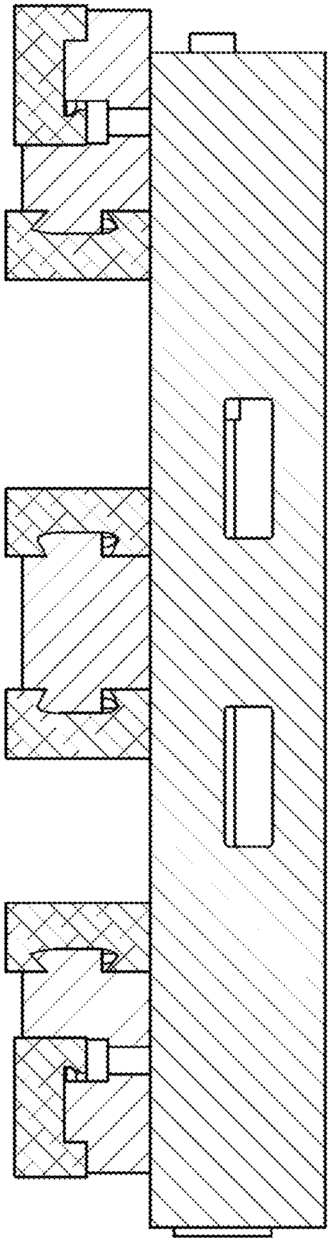
FIG. 13 depicts a cross-sectional view of the snap-jaw vice assembly in FIG. 12 along section line 11-11.
Figure 14:
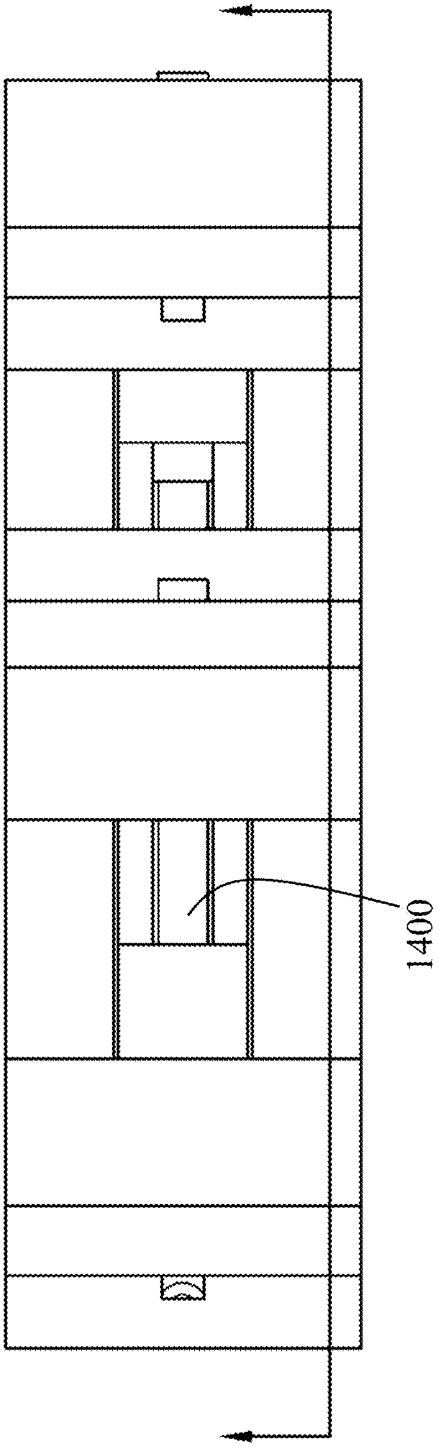
FIG. 14 depicts a top plan view of a snap-jaw vice assembly in accordance with one embodiment of the present invention.
Figure 15:
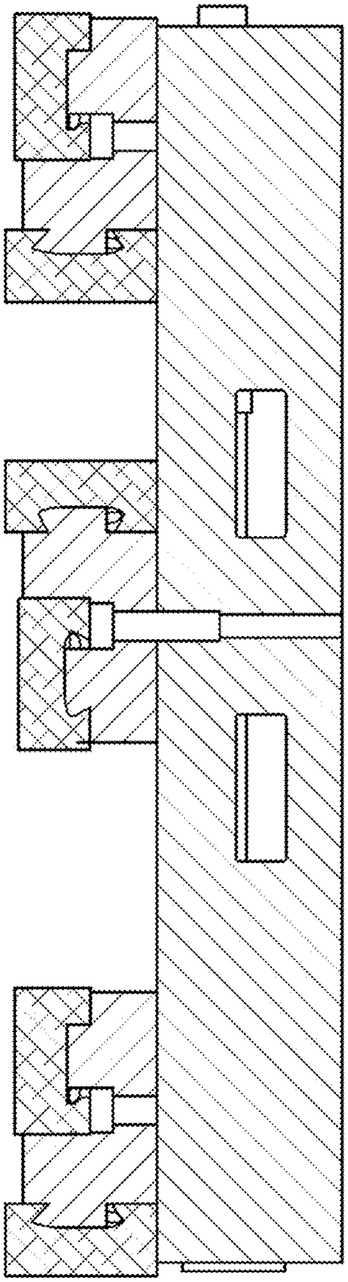
FIG. 15 depicts a cross-sectional view of the snap-jaw vice assembly in FIG. 14 along section line 13-13.

With reference to FIGS. 10-21, different vice assemblies are depicted. FIG. 10 depicts a top view of vice assembly, wherein FIG. 11 depicts a fixed horizontal snap jaw in the middle, flanked by a jaw bases each with a horizontal soft jaw member and vertical soft jaw member. A traveling base retention member 1104 may also be utilized to selectively retain and lock a vice block thereto. FIG. 12 depicts a top view of vice assembly, wherein FIG. 13 depicts a fixed center vertical snap jaw, flanked by a jaw bases each with a horizontal soft jaw member and vertical soft jaw member. FIG. 14 depicts a top view of vice assembly, wherein FIG. 15 depicts a fixed center vertical and horizontal snap jaw, flanked by a jaw bases each with a horizontal soft jaw member and vertical soft jaw member.

Figure 16:
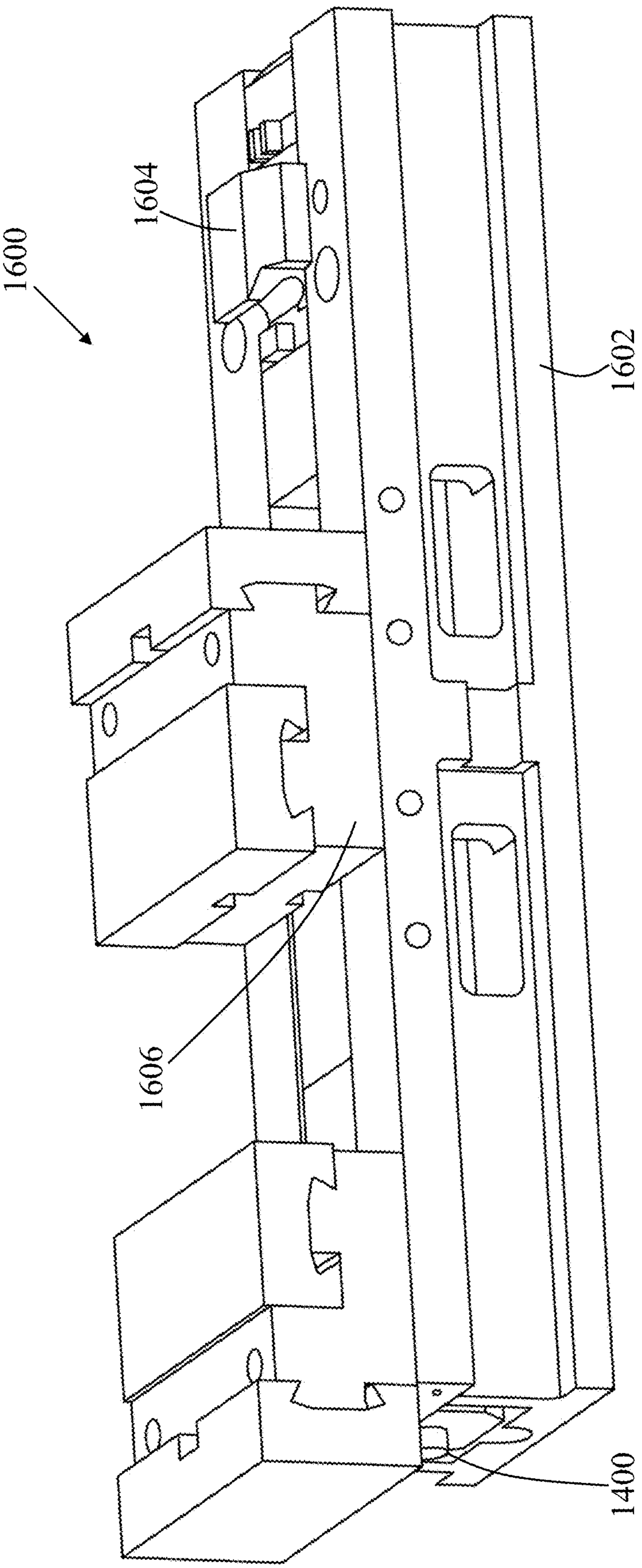
FIG. 16 depicts an overhead perspective views of a snap-jaw vice assembly in accordance with one embodiment of the present invention.
Figure 17:
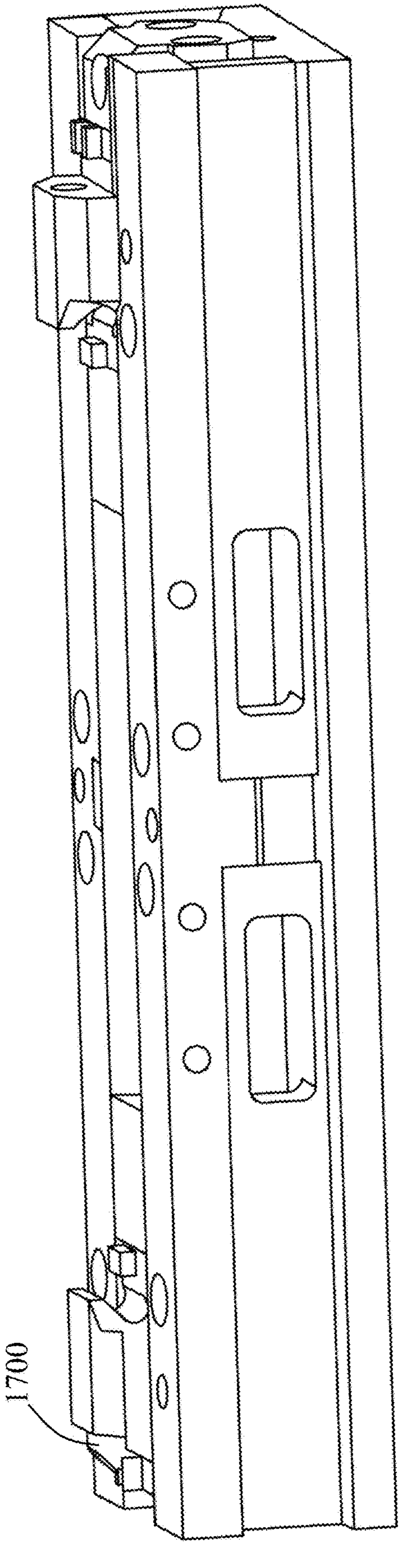
FIG. 17 depicts an overhead perspective views of a vice body in FIG. 16.
Figure 18:
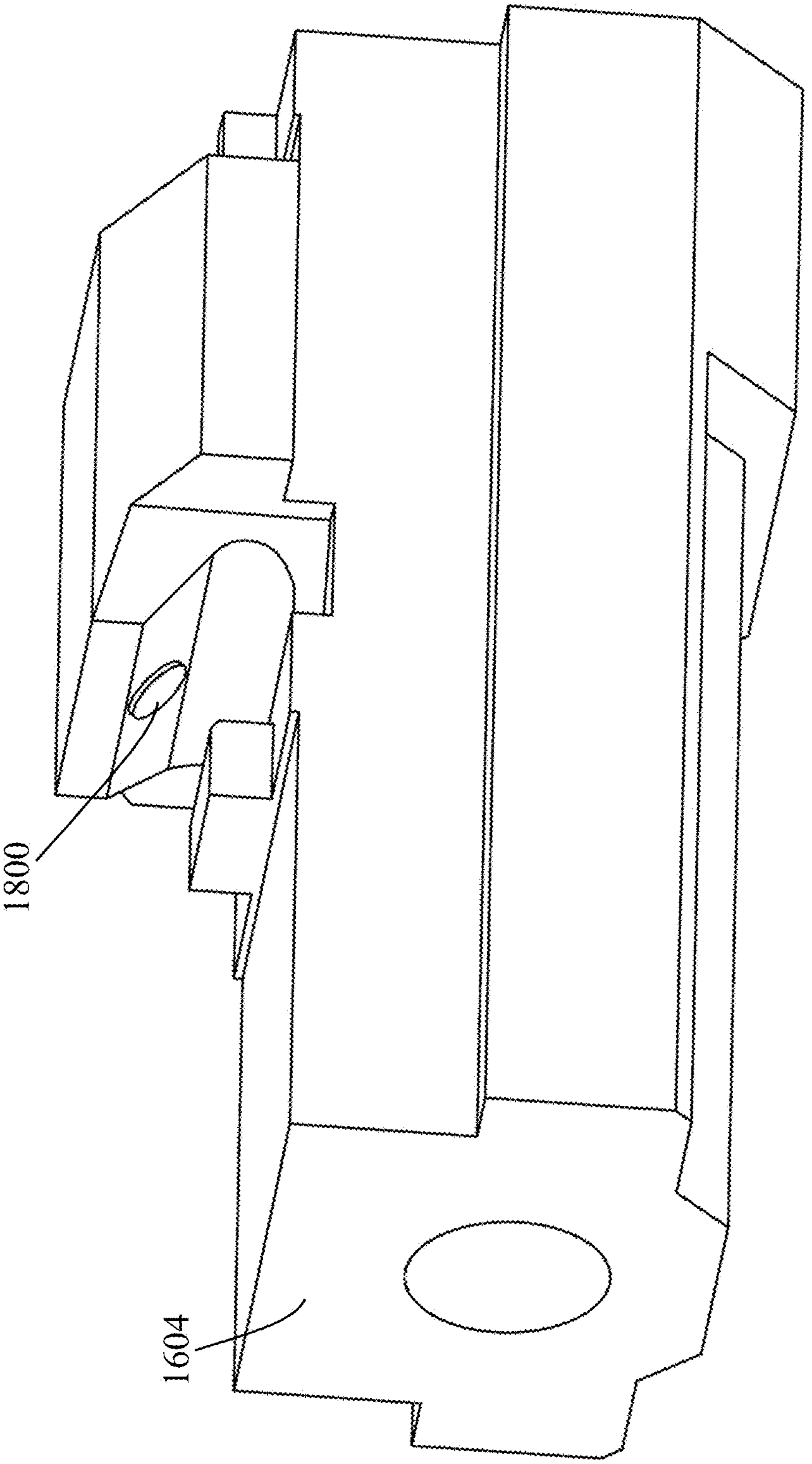
FIG. 18 depicts a perspective view of a jaw base latching member utilized in the vice body in FIG. 17.
Figure 19:
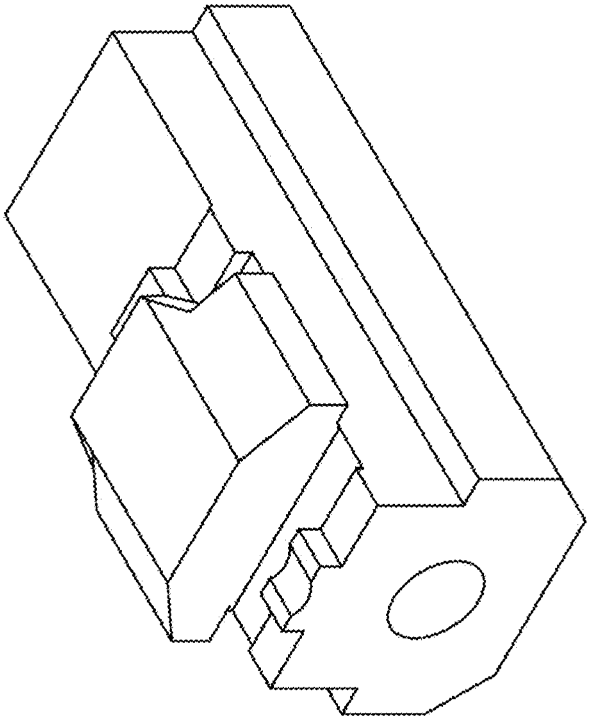
FIGS. 19-21 depict views of the jaw base latching member in FIG. 18.
Figure 20:
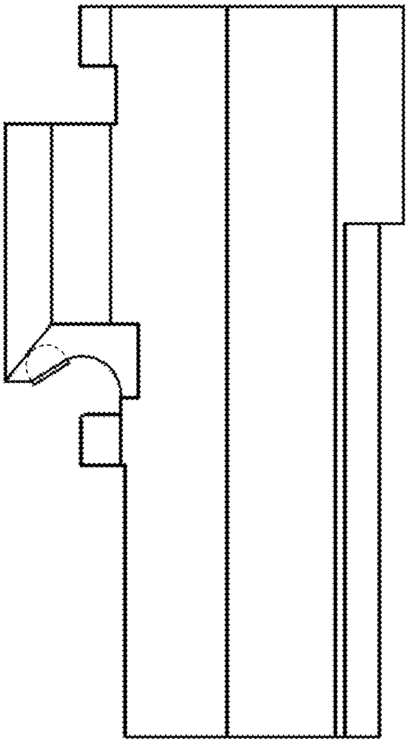
Figure 21:
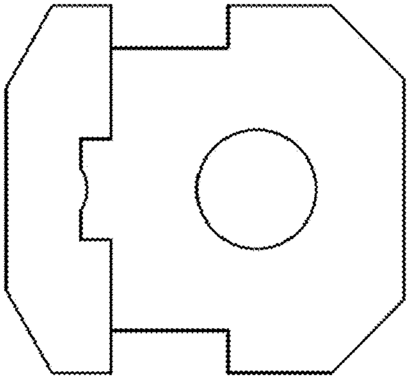

FIG. 16 depicts a perspective view of a vice assembly 1600 and beneficially includes vice body 1602 having the jaw base 1606 selectively removably coupled thereto in a tongue-and-groove and spring-biased configuration. In particular, as exemplified in FIGS. 17-21, the vice body 1602 includes a base retention member 1604 coupled to a rail member 1400 configured to linearly translate in the vice body 1602 and including a spring member 1700 coupled to a spring and compressively coupled against the jaw base 1606 to retain the jaw base 1606 against the base retention member 1604. As shown in FIGS. 18-21, a retained 10 mm ball 1800 is utilized in the base retention member 1604 as a misalignment tool, and can rotate when a base jaw is coupled to the base retention member 1604. Typically, a misalignment ball was included in a jaw base, which is conductive to a quick change jaw assembly, wherein incorporating the ball into the base retention member 1604 in said configuration still allows for said alignment capability. The ball 1800, which may fit and rotate in a cavity (outlined in FIG. 20), may include a chamfer (forming a half-ball) can serve to align and is not removed when the base retention member 1604 is uncoupled with the jaw base 1606. The retention member 1600 may be mechanically biased with a spring or manually translated and locked by a user to enable the retention member 1604 to engage with a wall or surface of the jaw body 1606, wherein the user would apply a counter force against the retention member to disengage the jaw body.

Although a specific order of executing operational steps has been disclosed, the order of executing the steps may be changed relative to the order shown in certain embodiments. Also, two or more steps shown or described as occurring in succession may be executed concurrently or with partial concurrence in some embodiments. Certain steps may also be omitted for the sake of brevity. In some embodiments, some or all of the process steps included can be combined into a single process.

What is claimed is:

1. A snap-jaw vice assembly comprising:

a jaw base with a base lower surface selectively removably couplable to a vice body, with two opposing base side surfaces, with a base upper surface, with a first pair of opposing base sidewalls, and with at least one member fastener having a lower flange member, defining an upper opening, defining a fastener channel spanning from the lower flange to the upper opening on the at least one member fastener, coupled to the jaw base with a spring fastener and a spring disposed in the fastener channel and compressively retained by the spring fastener and the lower flange member, the at least one member fastener forming one of the first pair of opposing base sidewalls and the at least one member fastener is operably configured to translate independent of the spring fastener; and a first jaw member with a pair of opposing member sidewalls spanning along a member length separating two opposing terminal member side surfaces of the first jaw member and with the pair of opposing member sidewalls selectively removably and directly coupled to the first pair of opposing base sidewalls in a spring-biased retained configuration.

2. The snap-jaw vice assembly according to claim 1, wherein the jaw base further comprises:

two member fasteners each coupled to the jaw base; and a guide member interposed between the two member fasteners, configured to couple with a guide member on the first jaw member in a M-F coupling configuration, and configured to align each of two opposing base end surfaces with one of the two opposing terminal member side surfaces.

3. The snap-jaw vice assembly according to claim 2, wherein the guide member on the jaw base and the guide member on the first jaw member are configured to align each of the two opposing base end surfaces with one of the two opposing terminal member side surfaces to define two parallel planes separated by edges defining the two opposing base side surfaces and edges defining the two opposing terminal member side surfaces.

4. The snap-jaw vice assembly according to claim 1, further comprising:

a first base channel defined by the first pair of opposing base sidewalls; and a cantilevered portion of the first jaw member, including the pair of opposing member sidewalls, and selectively removably disposed in the first base channel, directly coupled to the jaw base, and compressed and forced inwardly toward the jaw base by the at least one member fastener.

5. The snap-jaw vice assembly according to claim 4, wherein the first base channel and the cantilevered portion continuously span the member length.

6. The snap-jaw vice assembly according to claim 4, wherein the jaw base further comprises:

two member fasteners each coupled to the jaw base and biased to move toward the first base channel; and a guide member interposed between the two of the member fasteners disposed within the first base channel, configured to couple with a guide member on the first jaw member in a M-F coupling configuration.

7. The snap-jaw vice assembly according to claim 6, wherein the guide member of the jaw base is configured to couple with the guide member on the first jaw member in the M-F coupling configuration to align each of two opposing base end surfaces with one of the two opposing terminal member side surfaces.

8. The snap-jaw vice assembly according to claim 1, wherein the at least one member fastener forms a portion of the base upper surface and includes the spring fastener accessible from the base upper surface.

9. The snap-jaw vice assembly according to claim 1, further comprising:

a second pair of opposing base sidewalls of the jaw base, a second member fastener coupled to the jaw base with a spring and a spring fastener operably configured to selectively increase or decrease a spring bias of the second member fastener, the second member fastener forming one of the second pair of opposing base sidewalls;

a first member upper surface defined by outer edges of the first jaw member; and a second jaw member with a pair of opposing member sidewalls spanning along a member length separating two opposing terminal member side surfaces of the second jaw member, with a second member upper surface defined by outer edges of the second jaw member, and with the pair of opposing member side-walls of the second jaw member selectively removably and directly coupled to the second pair of opposing base sidewalls in a spring-biased retained configuration, the first and second member upper surfaces disposed in perpendicular orientations relative to one another.

10. The snap-jaw vice assembly according to claim 1, wherein the at least one member fastener is compressed against one of the pair of opposing member sidewalls and another of the pair of opposing member sidewalls is compressed against one of the first pair of opposing base sidewalls, forcing the first jaw member inwardly toward the jaw base.

11. The snap-jaw vice assembly according to claim 1, wherein the jaw base further comprises:

a threaded aperture defined thereon and with the spring fastener disposed therein and threadedly coupled to the jaw base.

12. The snap-jaw vice assembly according to claim 1, further comprising:

the vice body having the jaw base selectively removably coupled thereto in a tongue-and-groove and spring-biased configuration.

13. The snap-jaw vice assembly according to claim 12, wherein the vice body further comprising:

a base retention member coupled to a rail member configured to linearly translate in the vice body and including a spring member coupled to spring and compressively coupled against the jaw base to retain the jaw base against the base retention member.

14. A snap-jaw vice assembly comprising:

a jaw base with a base lower surface selectively removably couplable to a vice body, with two opposing base side surfaces, with a base upper surface, with a dovetail portion, defining a base channel, and with at least one member fastener forming a portion of the dovetail portion and having a spring and a spring fastener coupling the at least one member fastener to the jaw base and having a bias force, with the spring, to move the at least one member fastener toward the base channel; and a first jaw member with a dovetail portion selectively removably disposed in the base channel and directly coupled to the dovetail portion of the jaw base in a spring-biased retained configuration with the at least one member fastener generating a spring-loaded compressive and downward force on the dovetail portion of the first jaw member, wherein the first jaw member is operably configured to decouple from the jaw base by applying a transverse force, opposite the compressive force, by the first jaw member onto the at least one member fastener to overcome the bias force generated with the spring.

15. The snap-jaw vice assembly according to claim 14, wherein the jaw base further comprises:

a guide member configured to couple with a guide member on the first jaw member in a M-F coupling configuration and configured to align each of two opposing base end surfaces on the jaw base with one of two opposing terminal member side surfaces on the first jaw member.

16. A snap-jaw vice assembly comprising:

a jaw base with a base lower surface selectively removably couplable to a vice body, with two opposing base side surfaces, with a base upper surface, with a first pair of opposing base sidewalls defining a base channel, and with at least one member fastener coupled to the jaw base with a spring, a spring fastener, and having a bias force, with the spring, to move the at least one member fastener toward the base channel, the at least one member fastener forming one of the first pair of opposing base sidewalls; and a first jaw member with a pair of opposing member sidewalls spanning along a member length separating two opposing terminal member side surfaces of the first jaw member and with the pair of opposing member sidewalls selectively removably and directly coupled to the first pair of opposing base sidewalls in a spring-biased retained configuration with the at least one member fastener generating a spring-loaded compressive and downward force on the first jaw member, wherein the first jaw member is operably configured to decouple from the jaw base by applying a transverse force, opposite the compressive force, by the first jaw member onto the at least one member fastener to overcome the bias force generated with the spring.

* * * * *